March 16, 1943.                C. W. MOTT                2,314,236
                         HIGH PRESSURE HOSE FITTING
                            Filed Dec. 29, 1939
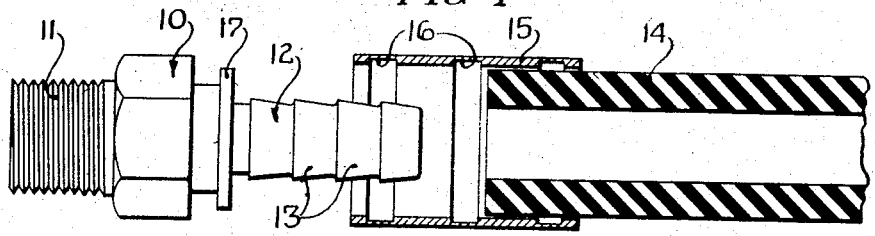
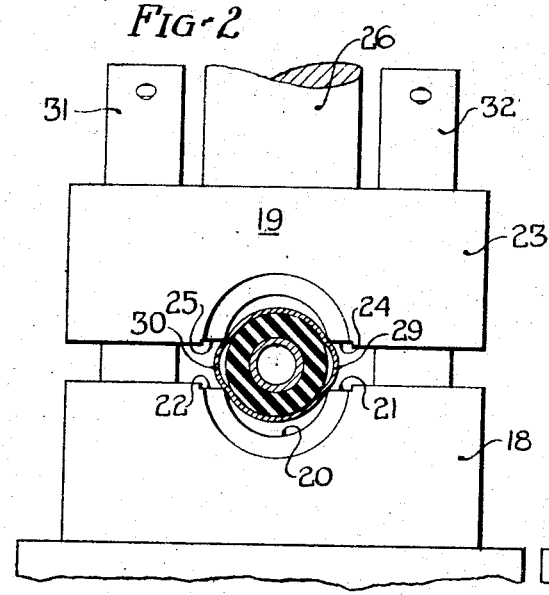
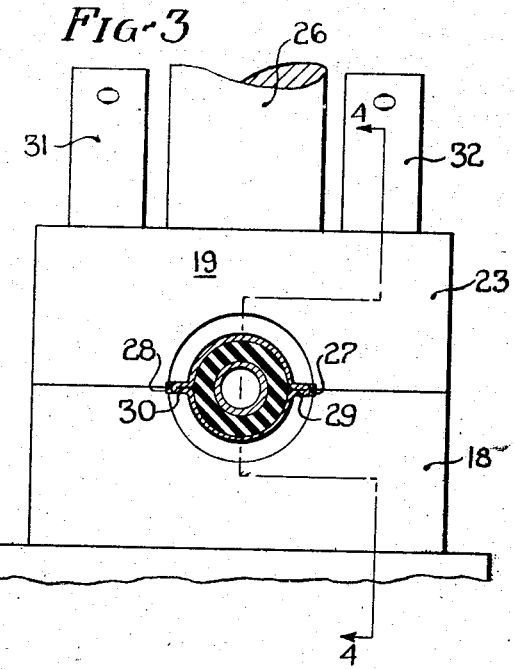
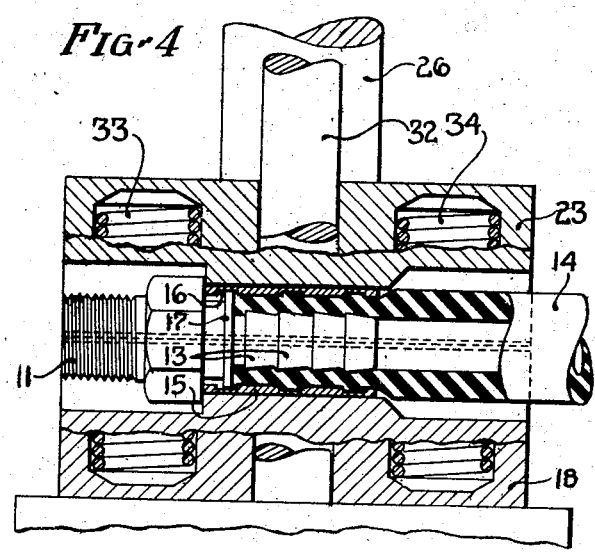
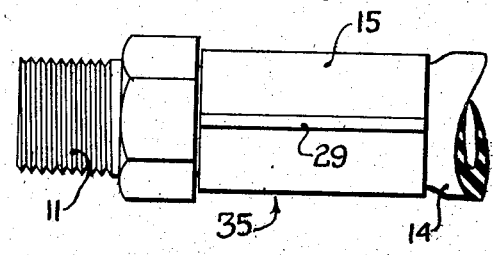
INVENTOR.
CARL W. MOTT
By Paul O. Pippel
ATT'Y.

Patented Mar. 16, 1943

2,314,236

UNITED STATES PATENT OFFICE 2,314,236

HIGH PRESSURE HOSE FITTING

Carl W. Mott, La Grange, Ill., assignor to International Harvester Company, a corporation of New Jersey Application December 29, 1939, Serial No. 311,650

3 Claims. (Cl. 285—84)

This invention relates to hose fittings and to a method for assembling the same to the end of a flexible hose.

An object of the invention is to provide a simple and inexpensive fitting for a hose which carries fluid at high pressure.

Another object of the invention is to provide a simple method for the assembling of hose fittings.

It is still another object of the invention to provide a method of assembling a hose fitting such as used with hose material adapted to carry fluids at high pressure.

It is still a further object of the invention to provide a fitting of the high pressure type that can be readily disassembled.

According to the present invention, the fitting includes an inner part having a nipple portion adapted to be seated within the end of the hose and a second or sleeve part adapted to surround the nipple portion and hose. For the clinching of the second part about the hose, there is provided two mold parts adapted to fit over the second part and to cause folding of this second part to obtain a radially extending flange which extends throughout the length of the second part. For the producing of this flange, and of the folding of the surplus portions of the second part, the molds are provided with recess portions, which upon adjoining one to the other during the pressing operation, form a pocket into which the surplus portions flow.

For a better understanding of the invention reference may be had to the following description taken in connection with the accompanying drawing, in which:

Figure 1 shows the inner end and outer parts in position ready to be assembled to the end of the hose;

Figure 2 illustrates the shaping of the material at the beginning of the clinching operation by the mold parts;

Figure 3 is a similar view to Figure 2, but showing in section the finished shaping of the outer part when the mold parts have been brought into contact with each other;

Figure 4 is a sectional view taken along the lines 4—4 of the mold parts and of the finished fittings; and, Figure 5 is an elevational view of the finished fitting removed from the mold parts.

Referring now to Figure 1, there is shown the parts about ready to be assembled to the end of a flexible hose.

The inner or coupling part designated at 10 has a threaded portion 11 and a nipple portion 12. This nipple portion 12 has corrugations 13 for the purpose of gripping the internal portions of the hose. The nipple portion 12 is inserted into the hose material 14 which is ordinarily rubber.

About the hose 14 and the nipple portion 12, there is slid into position an outer sleeve or second part 15. This sleeve part 15 has internal grooves 16 for the purpose of gripping the outer portions of the hose material when the sleeve is shaped to provide the finished fitting. The sleeve 15 is of sufficient diameter to slide readily along the hose material after the hose has been pushed into position about the nipple portion 12 of the inner part 10.

On the inner part 10, there is provided a radially extending flange 17 with which the groove 16, on the end of the sleeve, is registered when the fitting is ready for the clinching operation. The flange 17 is only of sufficient diameter that the same will permit the reducing of the diameter of the sleeve part about the same whereby the outer circumferential portions thereof will lie fully within the groove 16 after the clinching operation. This flange 17 will prevent any longitudinal movement of the sleeve 15 after the fitting parts may have in time broken away from the flexible or rubber material of the hose 14.

After the fitting parts 10 and 15 are loosely assembled, they are placed in a bottom part 18 of a mold indicated generally at 19. The mold part 18 is recessed to provide a half cylinder shape of such diameter as the fitting is desired to have after its clinching operation. This recess is indicated at 20. Along the sides of the recess 20 and extending the length thereof, there is provided relief recesses 21 and 22. Forming also a part of the mold 19 is an upper part 23 having a similar recess to that of the bottom part 18 and has also side recesses 24 and 25.

As the mold parts 23 and 18 come together, as accomplished by means of a press arbor 26, the recesses 21—24 and 22—25, form pockets 27 and 28 into which surplus portions of the sleeve part 29 and 30 flow respectively forming thereby radially extending flanges along the length of the sleeve part 15.

In order to guide the upper mold part 23 in its movement toward the lower mold part 18, there are provided guiding pins 31 and 32. When the pressure of the press arbor 26 is relieved, the mold parts will be opened by means of springs 33 and 34 which were compressed during the pressing operation. This will permit ready removal of an assembled fitting 35, such as shown in Figure 5. This fitting will comprise an inner part having a nipple portion extending into the end of the hose and a reduced sleeve part clinchingly surrounding the hose and nipple portion. This sleeve part will have radially and outwardly extending flanges formed of portions of the sleeve part folded back on themselves, the flanges extending the entire length of the sleeve.

It should be noted that after the clinching operation the groove 16 is fitted about the flange 17, as viewed in Figure 4. Also, that the flexible material of the hose is well seated within the corrugations 13 of the nipple 12 and also within the grooves 16 of the sleeve part 15.

Should one ever desire to remove the sleeve part 15, and the inner part 10, it would only be necessary to file along the edge of the flange portions a sufficient amount to permit division of portions of the sleeve part 15.

It should now be apparent that there has been provided a simple high pressure hose fitting and a simple method of assembling a hose fitting and one which is particularly adaptable for the assembling of fittings to hose material carrying fluids at high pressures.

While various changes may be made in the means for forming the outer sleeve part 15, it shall be understood that these other forms shall be within the spirit and scope of the present invention as defined in the appended claims.

What is claimed is:

1. In combination, a hose, a fitting having a portion engaging the inside of a portion of the hose, a sleeve engaging the outside of the said portion of the hose, said portion of the hose being under a high state of compression by virtue of engagement thereof by the fitting and the sleeve, the sleeve having an external fold extending from one end to the other, whereby cutting through of the fold permits easy removal of the sleeve and the fitting from the hose.

2. In combination, a hose, a fitting having a portion engaging the inside of a portion of the hose, a sleeve engaging the outside of the said portion of the hose, said portion of the hose being under a high state of compression by virtue of engagement thereof by the fitting and the sleeve, the sleeve having a pair of diametrically opposed folds extending from one end to the other, whereby cutting through of the folds permits easy removal of the sleeve and the fitting from the hose.

3. In combination, a hose, and a sleeve engaging the outside of a portion of the hose, said portion of the hose being under a high state of compression by virtue of engagement thereof by the sleeve, the sleeve having an external fold extending from one end to the other, whereby cutting through the fold permits easy removal of the sleeve from the hose.

CARL W. MOTT.